United States Patent [19]

Wilterding

[11] 4,279,551
[45] Jul. 21, 1981

[54] HOLE SAW PILOT PIN WITH PLUG RETRIEVAL MECHANISM

[76] Inventor: Jerry L. Wilterding, 2907 Meadow La., Barnwell, S.C. 29812

[21] Appl. No.: 62,154

[22] Filed: Jul. 26, 1979

[51] Int. Cl.³ .................. B23B 47/00; B23B 51/00
[52] U.S. Cl. ............................ 408/67; 408/207
[58] Field of Search ............. 408/67, 68, 187, 209, 408/207

[56] References Cited

U.S. PATENT DOCUMENTS

| | | | |
|---|---|---|---|
| 485,715 | 11/1892 | Smith | 408/67 |
| 2,394,612 | 2/1946 | Horne, Jr. | 408/187 |
| 2,404,027 | 7/1946 | Belanger | 408/187 |
| 2,601,434 | 6/1952 | DuBois | 408/67 |
| 2,800,812 | 7/1957 | Mueller et al. | 408/67 |
| 3,572,182 | 3/1971 | MacDonald | 408/187 |
| 3,922,107 | 11/1975 | Fowler | 408/67 |
| 4,057,357 | 11/1977 | Daghe et al. | 408/67 |

FOREIGN PATENT DOCUMENTS 606687  5/1978  U.S.S.R. ........................ 408/209

Primary Examiner—Harrison L. Hinson
Attorney, Agent, or Firm—Harvey B. Jacobson

[57] ABSTRACT

A catch is pinned or screwed to a conventional hole saw pilot pin. The catch is free to pivot through an axial cutout in the pilot pin. The catch is sized and oriented to pass through a previously drilled standard sized pilot hole and is then pivotable out of the cutout into a projecting position extending radially of the pilot hole. In this position, a cut plug is retained on the pilot pin rather than dropped. Upon completion of sawing, the catch can be manually positioned back into the pilot pin cutout and the cut plug can then be removed.

5 Claims, 5 Drawing Figures

HOLE SAW PILOT PIN WITH PLUG RETRIEVAL MECHANISM

BACKGROUND OF THE INVENTION

1. Field of the Invention

This invention relates to the field of cutting tools in general and specifically to such tools which are adapted for cutting circular holes in sheet metal, piping, or the like.

2. Discussion of Related Art

Hole saws have been used for many years for the purpose of producing circular apertures in prescribed locations on both planar and curved work surfaces. One of the problems encountered with the use of such saws, especially when used to cut a hole in an enclosed structure, is the retrieval of the cut portion from the interior of the structure. U.S. Pat. No. 485,715, issued Nov. 8, 1892, to Smith, shows a milling tool or cutter used in connection with an apparatus for tapping water mains or other pipes. The Smith device includes a drill which is provided with one or more spring catches which are properly secured to the drill in suitable recesses. The upper portion of the springs project a little beyond the surface of the drill and as the milling tool is being operated, the upper ends will gradually be pressed inward until they pass entirely through the pilot hole. The springs are then effective to retain the cut portion. U.S. Pat. No. 2,800,812, issued July 30, 1957, to Mueller et al, shows a shell cutter assembly which is provided with a pilot drill with means provided on the pilot drill for retaining cut sections. Such means takes the form of a threaded shoulder or detent which is retracted to pass through the hole drilled by the pilot drill and then extended radially outward to engage beneath the cut section. The means comprises a plug which engages one end of a coil spring, the other end of which seats within a bore formed in the detent. U.S. Pat. No. 2,941,427, issued June 21, 1960, to Ver Nooy shows a coupon retainer means for use with tapping machines. The coupon retainer comprises a sleeve which is mounted on the shank of the pilot drill so as to permit rotation of the drill within the sleeve, while the sleeve is limited in longitudinal movement with respect to the pilot drill. Crimping means are provided on the body of the sleeve for engaging and carrying the coupon when the sleeve has advanced into the pilot drill bore hole.

SUMMARY OF THE INVENTION

One object of the present invention is to provide a pilot pin or drill with a plug retrieval mechanism, which mechanism is simple to construct, inexpensive to manufacture, yet is effective and safe in retrieving a plug.

A further object of the present invention is to provide a pilot pin or drill with a plug retrieval mechanism which mechanism, can be completely disposed within the circumference of the pilot drill or pin in order that the mechanism will not interfere with insertion of the drill or pin through the work material.

An additional object of the present invention is to provide a pilot pin or drill with a plug retrieval mechanism, which mechanism will be capable of providing a surface extending radially of the pilot pin or drill for engaging the bottom surface of the hole plug which has been cut.

In accordance with the above objects of the present invention, a hole saw pilot pin or drill has a slot formed therethrough as an axial cut in the pin or drill. A mounting pin is inserted transversely of the slot and rotatably mounts a catch. The catch is mounted in an offset manner such that it can pivot between a position longitudinally aligned with the pilot pin or drill and a second position extending radially of the pin or drill. A stop pin can also be inserted in the slot to define the proper angular orientation of the catch when in its radially extending position. The pilot pin or drill is inserted through a pilot hole and the catch will easily be retained in its aligned position. When through the hole, gravity or centrifugal force will be effective to throw the catch sideways whereupon it will engage the bottom of a plug after it is cut and effect removal of the plug from the cut hole.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
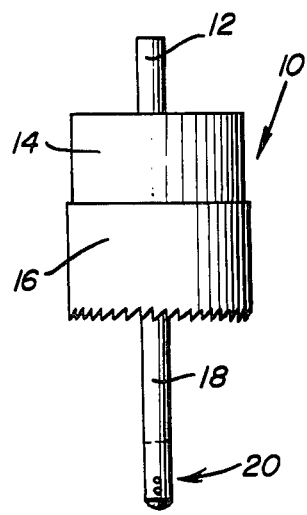
FIG. 1 is a side elevational view of a hole saw with a pilot pin having a plug retrieval mechanism of the present invention with the catch in its aligned position.

Now with reference to the drawings, a hole saw pilot pin with plug retrieval mechanism incorporating the concepts and principles of the present invention and generally referred to by the numeral 10 will be described in detail. FIG. 1 shows a shaft 12 carrying an arbor 14. The arbor 14 is attached to and causes rotation of a hole saw 16. Extending axially of the hole saw 16 and arbor 14 is a pilot pin 18 with a retrieval mechanism 20 connected to its free end. It should be noted that, while the retrieval mechanism 20 is shown as used with a hole saw and pilot pin, the use of this mechanism is not limited strictly to hole saws nor to use as part of a pilot pin, but could be incorporated into a drill bit just above the flutes.

Figure 5:
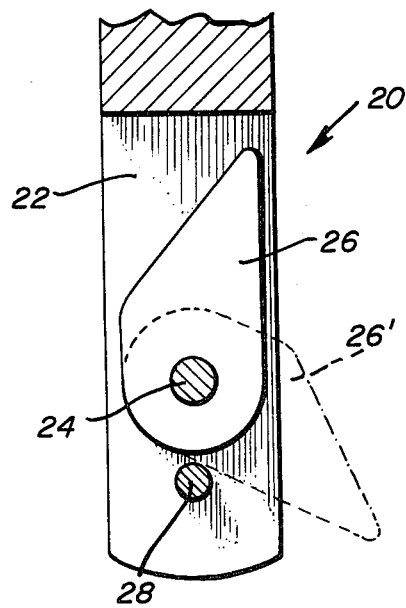
FIG. 5 is an elevational sectional view taken substantially along a plane passing through section line 5—5 of FIG. 4.
Figure 4:
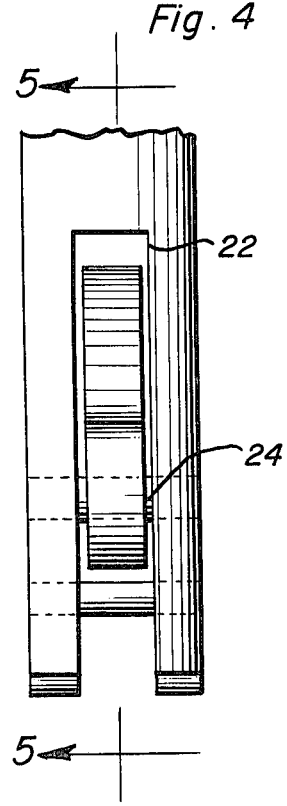
FIG. 4 is an enlarged elevational view showing the catch mechanism of the present invention.

FIGS. 4 and 5 show that the retrieval mechanism 20 includes a slot 22 formed axially of the pilot pin 18 and extending all the way through the pilot pin. A mounting pin 24 extends laterally across the slot 22 and rotatably mounts catch 26. The catch 26 comprises an elongated substantially planar member which pivots in an offset manner on mounting pin 24. The width of the catch 26 is less than the diameter of pilot pin 18 and, accordingly, the entire catch can be swivelled to its aligned position shown in FIGS. 4 and 5. The catch can be pivoted to its retrieval position shown in phantom at 26', with this position being defined by the placement of stop pin 28 which also extends laterally across slot 22 and abuts one lateral edge of the catch 26 when in its retrieval position. As will be noted when in position 26', the catch extends radially of the pilot pin 18 so that the pilot pin cannot be slid out of a hole having substantially the same diameter as the pilot pin. It should be further noted that the pilot pin normally has a ¼ inch diameter and is therefore able to accept the relatively simple retrieval mechanism 20 while it would be unable to receive more complicated mechanisms.

Figure 2:
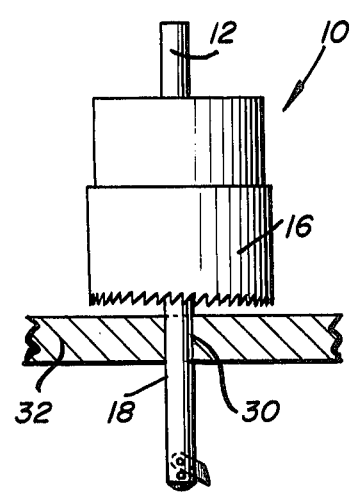
FIG. 2 is a side elevational view of a hole saw with a pilot pin and a plug retrieval mechanism of the present invention shown with the pilot pin inserted through a pilot hole prior to cutting a plug.
Figure 3:
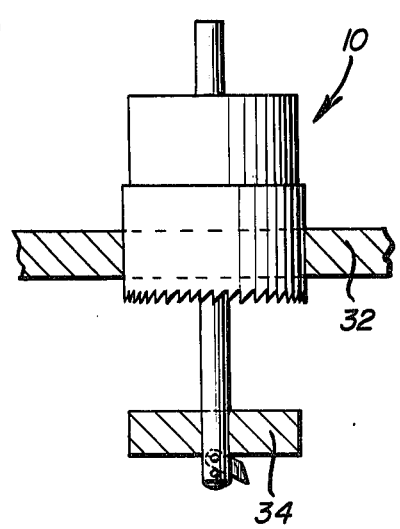
FIG. 3 is a hole saw with a pilot pin and plug retrieval mechanism of the present invention shown with the catch retaining a cut plug.

FIGS. 2 and 3 show the hole saw 10 in use. Initially a pilot hole 30 is drilled through the workpiece 32. Pilot hole 30 would, of course, have a diameter sufficient to accept the pilot pin 18. The pilot pin 18 is inserted in hole 30 and catch 26 will assume its aligned position thereby providing no protuberances to inhibit the smooth insertion of the pin into the hole. Once the pin is in the hole, saw 16 can be rotated through shaft 12 to cut plug 34 from the workpiece 32. During rotation of the saw, pin 18 is also rotated and the centrifugal force associated with such rotation will cause the catch 26 to rotate about pin 24 into the radially extending retrieval position 26'. When the plug 34 falls from the workpiece 32, it is caught on the catch 26 and can easily be removed from the hole.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A plug retrieval mechanism for use in retaining a cut plug on an elongated rotatable member extending outwardly from a rotatable cutting means for cutting said plug, said mechanism comprising:
   a longitudinally extending slot formed in a free end of said member;
   a mounting pin affixed to said member and extending across and contained substantially with said slot;
   an elongated catch rotatably mounted on said mounting pin at a position offset from a center portion of said catch, said catch being capable of rotation between a first position in substantial alignment with said member with all surfaces of said catch being contained within a plane defined by an outer diameter of said member, and a second position where said catch extends radially of said member.

2. The mechanism defined in claim 1 wherein said cutting means is a hole saw and said elongated rotatable member comprises a guide pin associated with said hole saw.

3. The plug retrieval mechanism of claim 1 and further including a stop pin affixed to said member and extending across said slot between said mounting pin and said free end of said member.

4. A plug retrieval mechanism for use in retaining a cut plug, said mechanism comprising in combination:
   a rotatable drive shaft attached to a power supply means, said power supply means being utilizable to rotate said drive shaft;
   a plug cutting means, said plug cutting means including a hole saw fixedly attached to and longitudinally aligned with said rotatable drive shaft;
   a pilot pin longitudinally aligned with said hole saw and extending outwardly therefrom so as to be insertable through a pilot hole prior to said hole saw cutting said plug;
   a longitudinal slot formed in a free end of said pilot pin remote from said hole saw;
   a mounting pin fixedly attached to said pilot pin and extending transversely across said slot;
   a catch rotatably mounted on said mounting pin and being positionable in a first position wherein all of the surfaces of said catch are contained substantially within said slot and in a second position wherein said catch extends outwardly from said slot so as to perform a plug retrieval function once said plug has been cut by said hole saw; and
   a stop pin fixedly attached to said pilot pin and extending transversely across said slot at a position proximate to said mounting pin so as to provide a movement limiting means for said catch once said catch is in a position extending outwardly from said slot.

5. The plug retrieval mechanism as defined in claim 4, wherein said catch is movable from its first position substantially contained within said slot to its second position extending outwardly from said slot by centrifugal force provided by a rotation of said rotatable drive shaft.

* * * * *